United States Patent
Berridge et al.

(10) Patent No.: US 11,693,199 B2
(45) Date of Patent: Jul. 4, 2023

(54) 12 FIBER MPO TO 16 FIBER MPO CONVERSION MODULE

(71) Applicant: Panduit Corp., Tinley Park, IL (US)

(72) Inventors: Benjamin J. Berridge, Highland, IN (US); Robert A. Reid, Battle Ground, IN (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/088,724

(22) Filed: Nov. 4, 2020

(65) Prior Publication Data
US 2021/0141177 A1   May 13, 2021

Related U.S. Application Data

(60) Provisional application No. 62/932,170, filed on Nov. 7, 2019.

(51) Int. Cl.
*G02B 6/43* (2006.01)
*G02B 6/44* (2006.01)

(52) U.S. Cl.
CPC ............. *G02B 6/43* (2013.01); *G02B 6/4453* (2013.01); *G02B 6/4471* (2013.01)

(58) Field of Classification Search
CPC .................................................... G02B 6/4453
See application file for complete search history.

(56) References Cited

U.S. PATENT DOCUMENTS

| | | | |
|---|---|---|---|
| 2015/0162982 A1* | 6/2015 | Buff | H04B 10/25 398/142 |
| 2016/0062066 A1 | 3/2016 | Lee et al. | |
| 2016/0062068 A1 | 3/2016 | Giraud et al. | |
| 2016/0209614 A1 | 7/2016 | Case | |
| 2017/0192191 A1 | 7/2017 | Dagley et al. | |

OTHER PUBLICATIONS

Prweb.Com: Jan. 27, 2021; Opticonx Introduces MTP Conversion Module Designed to Fully Utilize Your Fiber Network; Opticonx Introduces MTP Conversion Module Designed to Fully Utilize Your Fiber Network Conversion Module from Opticonx—New Product Conversion Module from Opticonx—New Product; OPTICONX, Mar. 7, 2017 (Mar. 7, 2017) XP055769597; Retrieved from the Internet: URL:https://web.archive.org/web/2017030712 0737/http://www.prweb.com/releases/2017/opticonx/prwebl4117270.htm [retrieved on Jan. 27, 2021] the whole document; 4 pgs.

Prweb.Com: Xtreme 12: 10/25/40/50/100 Conversion Module, Mar. 7, 2017 (Mar. 7, 2017); XP055769604; Retrieved from the Internet: URL:http://wwl.prweb.com/prfiles/2017/03/0 3/14117270/Conversion%20Module%20Flyer.pdf [retrieved on Jan. 27, 2021]; the whole document; 1 pg.

Prweb.Com: Opticonx Opticonx: Xtreme 12Solutions; Oct. 1, 2017 (Oct. 1, 2017); XP055769606; Retrieved from the Internet: URL:https://opticonx.com/wp-content/upload s/2017/10/Xtreme12-Brochure.pdf; [retrieved on Jan. 27, 2021] the whole document; 8 pgs.

* cited by examiner

*Primary Examiner* — Sung H Pak
(74) *Attorney, Agent, or Firm* — Christopher S. Clancy; James H. Williams; Christopher K. Marlow

(57) ABSTRACT

A cassette module has three 16 fiber MPOs and four 12 fiber MPOs wherein each 16 fiber MPO has 4 fiber receiving areas with four fibers going to each fiber receiving area and each 12 fiber MPO has 3 fiber receiving areas with four fibers going to each fiber receiving area. Fibers are routed from certain areas of the 16 fiber MPOs to those of the 12 fiber MPOs in order to convert a base 12 communication system to a base 16 communication system.

4 Claims, 10 Drawing Sheets

Pinout configuration for a 16 fiber MPO transceiver with Tx and Rx channels called out Isometric View of HD Flex Conversion Cassette Detailed view of 12 fiber MPO adapter (right) and 16 fiber MPO adapter (left)

Front and Rear Isometric views of Opticom Conversion Cassette

12 FIBER MPO TO 16 FIBER MPO CONVERSION MODULE

CROSS REFERENCE TO RELATED APPLICATIONS

This application claims benefit to U.S. Provisional Patent Application No. 62/932,170, filed on Nov. 7, 2019, the entirety of which is hereby incorporated by reference herein.

FIELD OF THE INVENTION

The present invention relates generally fiber optic communications and more specifically to cassettes for converting base 12 communications systems to base 16 communication systems.

BACKGROUND

Many large corporate accounts with on-premise data centers have invested heavily over the last 10+ years in LOMMF (Laser Optimized MultiMode Fiber) cabling systems based on "plug and play" 12-fiber MPO (multi-fiber push-on) connectivity (12 fiber trunks and 12 fiber breakout cassettes, see FIG. 1). These solutions were easily 'migratable' to higher speed BASE-8 transceiver optics such as 40 G/100 G SR4 QSFP/QSFP28 by replacing the breakout cassettes with MPO coupler panels, connecting the 12 fiber trunks that serviced the cassettes to the rear of the MPO panels and deploying 8 or 12 fiber equipment jumpers at the end points as shown in FIG. 2. Using this migration strategy yields the creation of 4 "dark fiber" strands, which most customers have accepted. Recently, at least one significant DC switch OEM has recently launched 400 G SR8 transceiver optics which require 16 fiber MPOs to connect transceiver to transceiver.

In order to minimize costs for customers who have existing BASE12 array/MPO cable plant (as noted above) and obviate the need for "rip & replace" such for the deployment of SR8 optics, we suggest "SR8 mitigation" cassettes be attached to each end to convert the BASE12 cable plant to BASE16. These modules would repurpose/reposition/re-deploy the fibers from four, BASE12 MPO trunk units (48 fibers total) into three, BASE16 MPO connectors (48 fibers total) in the form of a module that has four 12 fiber MPO connector adapters in the rear and three 16 fiber MPO connector adapters in the front.

SUMMARY

A cassette module has three 16 fiber MPOs and four 12 fiber MPOs wherein each 16 fiber MPO has 4 fiber receiving areas with four fibers going to each fiber receiving area and each 12 fiber MPO has 3 fiber receiving areas with four fibers going to each fiber receiving area. Fibers are routed from certain areas of the 16 fiber MPOs to those of the 12 fiber MPOs in order to convert a base 12 communication system to a base 16 communication system. There are fibers going from the first, second, and third fiber receiving areas of MPO Front Port 1 to the first, second, and third fiber receiving areas of MPO Rear Port 4, fibers going from the third fiber receiving area of MPO Front Port 1 to the second fiber receiving area of MPO Rear Port 3. In addition, there can be fibers going from the first and fourth fiber receiving areas of MPO Front Port 2 to the first and third fiber receiving areas of MPO Rear Port 3, fibers going from the second and third fiber receiving areas of MPO Front Port 2 to the first and third fiber receiving areas of MPO Rear Port 2, fibers going from the second fiber receiving group of MPO Front Port 3 to the second fiber receiving area of MPO Rear Port 2, and fibers going from the first, third, and fourth fiber receiving area of MPO Front Port 3 to the first, second, and third fiber receiving areas of MPO Rear Port 1.

DETAILED DESCRIPTION OF THE INVENTION

Figure 1:
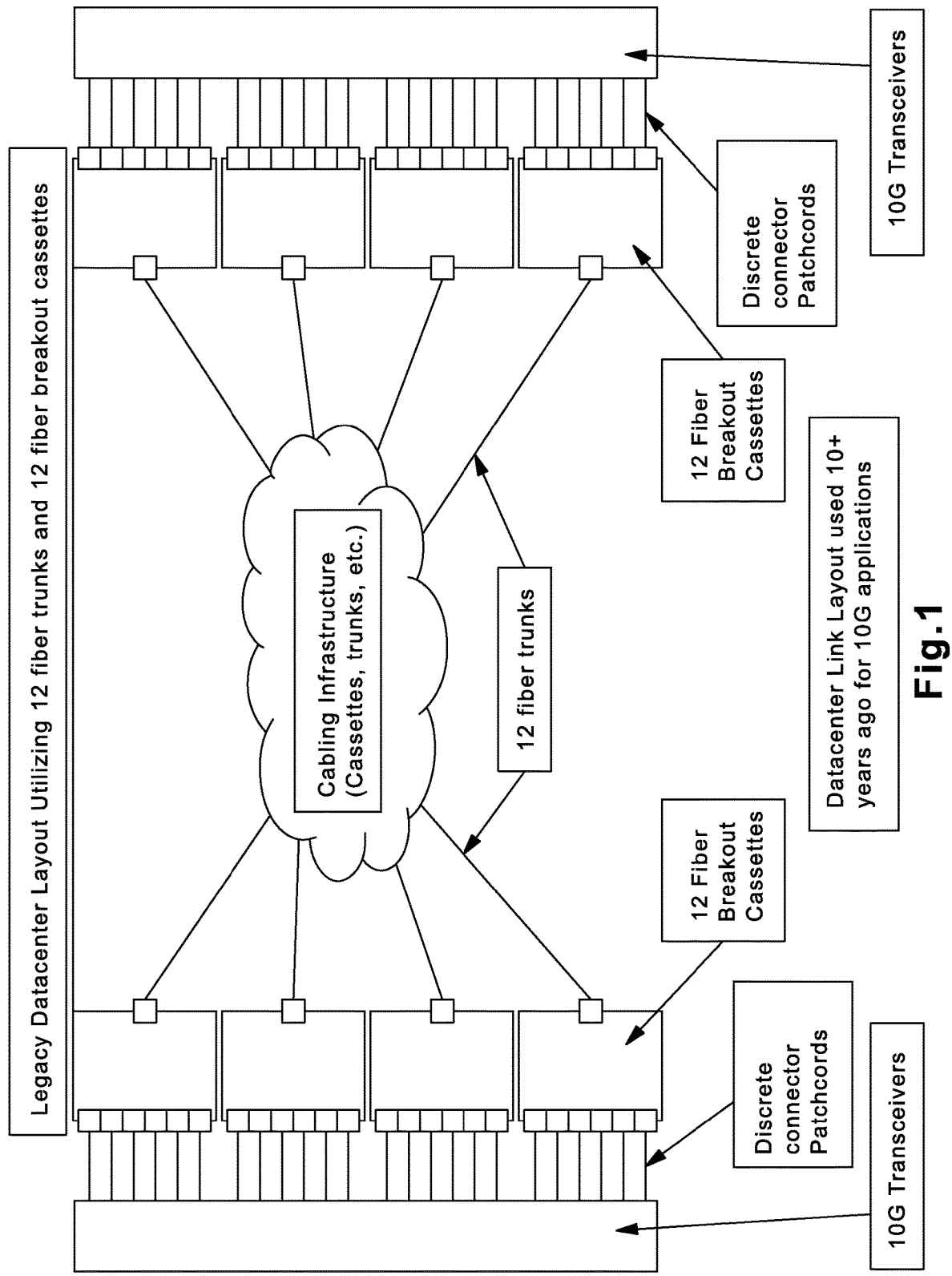
FIG. 1 shows a legacy datacenter layout utilizing 12 fiber trunks and 12 fiber breakout cassettes.
Figure 2:
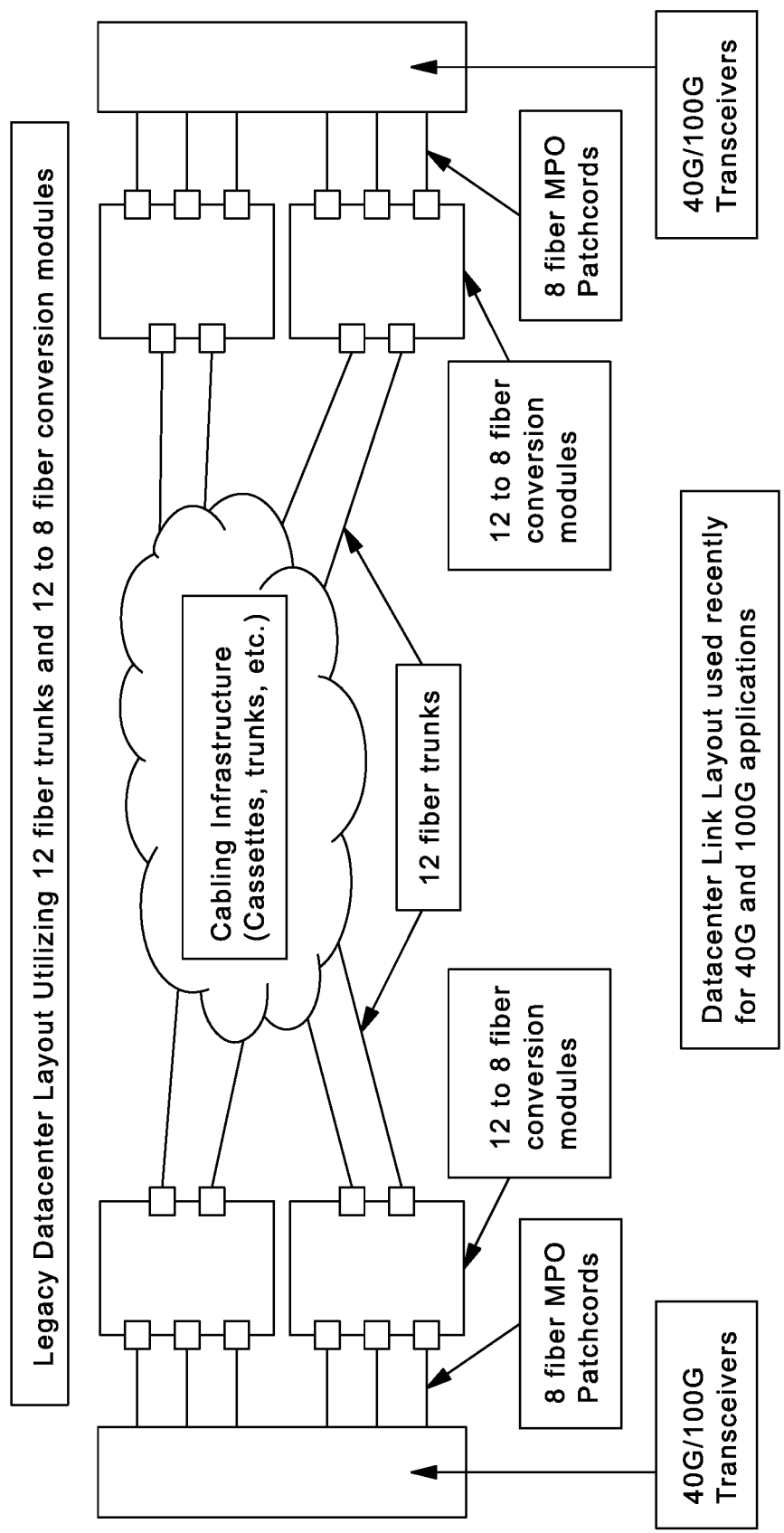
FIG. 2 shows a legacy datacenter layout utilizing 12 fiber trunks and 12 to 8 fiber conversion modules.
Figure 3:
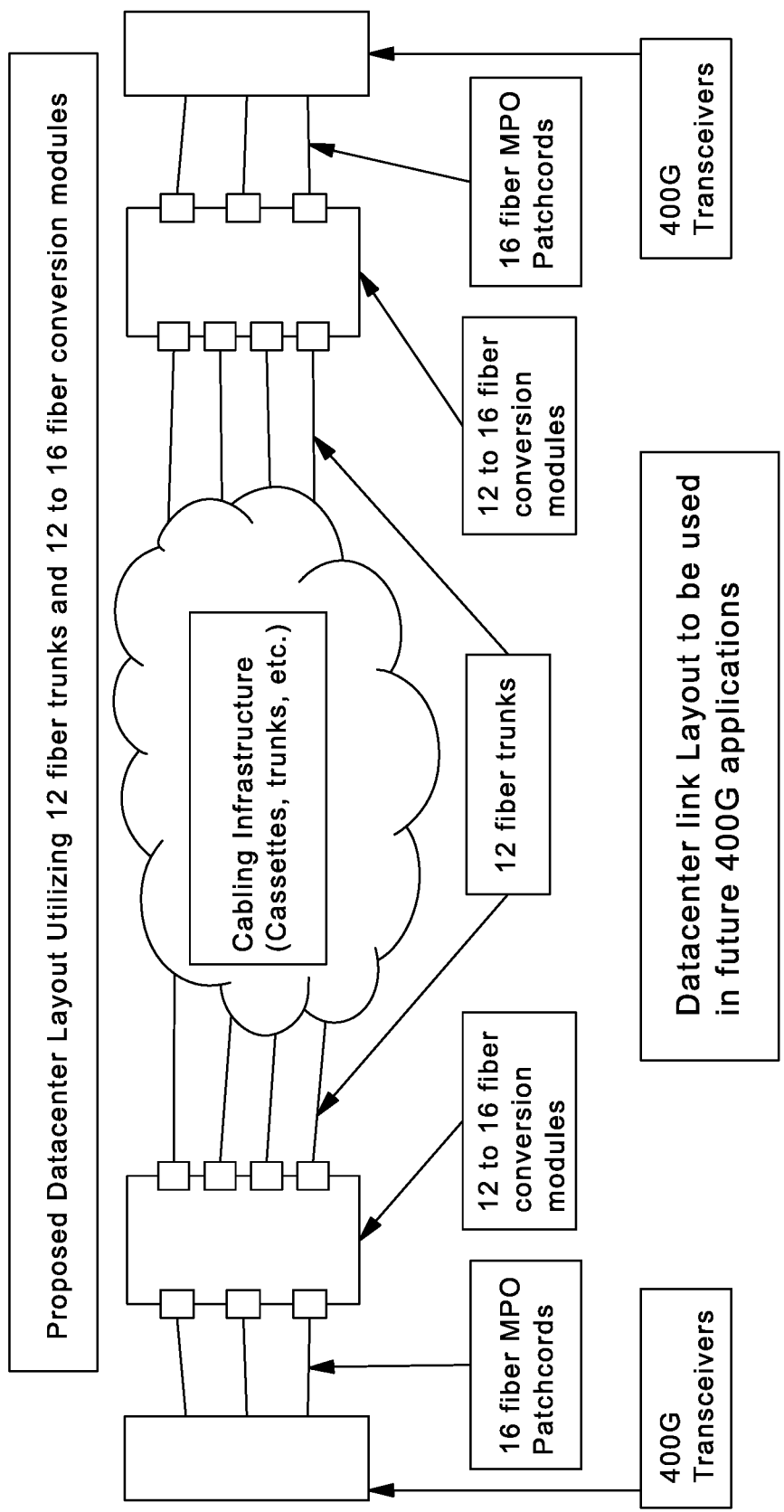
FIG. 3 shows a datacenter layout utilizing 12 fiber trunks and 12 to 16 fiber conversion modules.

FIG. 3 shows a system using 12 fiber trunks with a 12 to 16 fiber conversion system using 12 to 16 fiber conversion modules.

Figure 4:
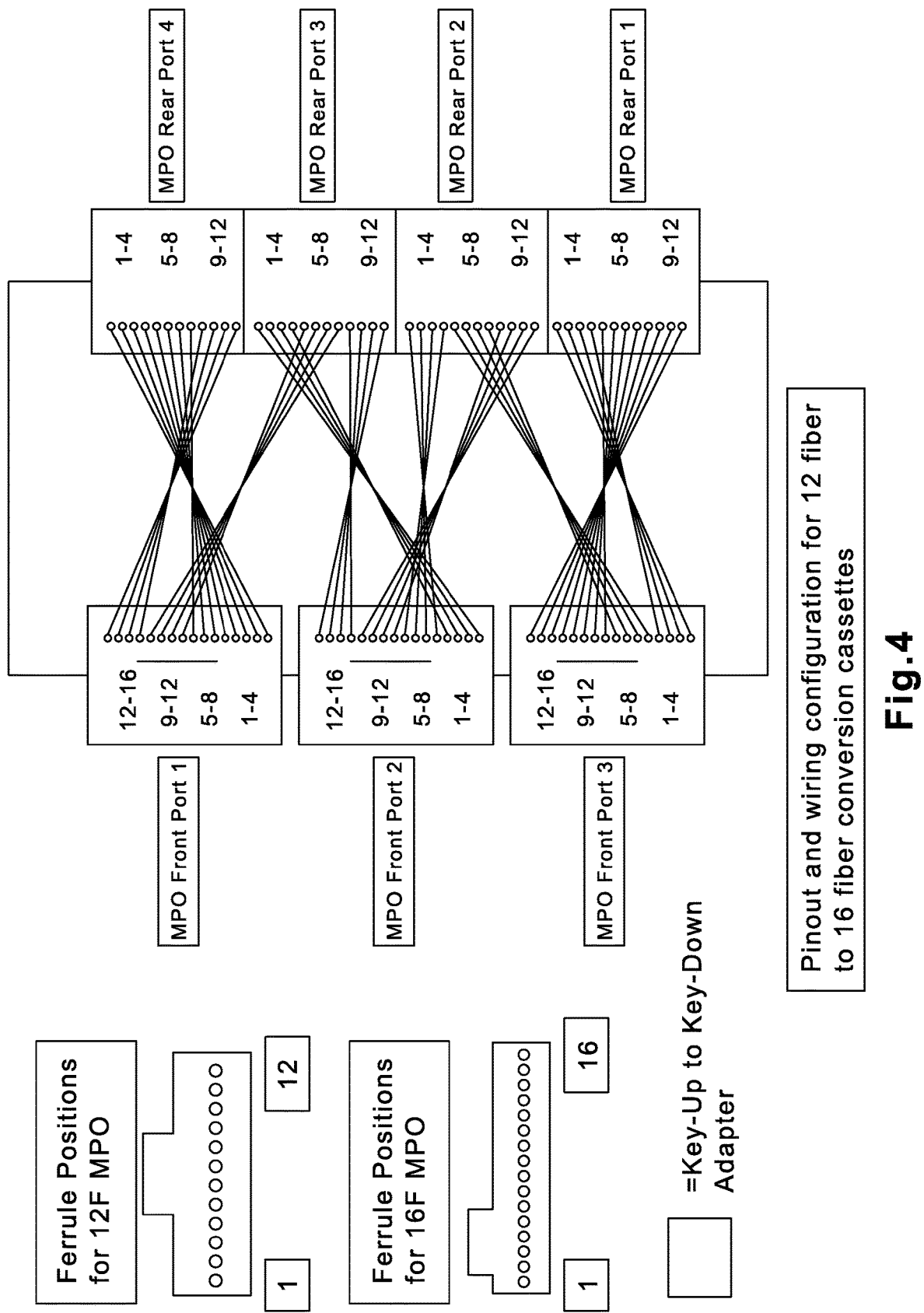
FIG. 4 shows the wiring configuration for the 12 fiber to 16 fiber conversion modules of FIG. 3.

The inside pinout of the 12 to 16 conversion modules can be as shown in FIG. 4. With the indicated wiring, the signal will travel correctly from transmit to receive from transceiver to transceiver on each end of the link. This fanout can either be manufactured using traditional methods or an optical flex circuit can be created due to the complexity of the fanout.

As can be seen in FIG. 4, each 16 fiber MPO has 4 fiber receiving areas with four fibers going to each fiber receiving area and each 12 fiber MPO has 3 fiber receiving areas with four fibers going to each fiber receiving area. There are fibers going from the first (1-4), second (5-8), and third (12-16) fiber receiving areas of MPO Front Port 1 to the first (1-4), second (5-8), and third (9-12) fiber receiving areas of MPO Rear Port 4, fibers going from the third (9-12) fiber receiving area of MPO Front Port 1 to the second (5-8) fiber receiving area of MPO Rear Port 3, fibers going from the first (1-4) and fourth (12-16) fiber receiving areas of MPO Front Port 2 to the first (1-4) and third (9-12) fiber receiving areas of MPO Rear Port 3, fibers going from the second (5-8) and third (9-12) fiber receiving areas of MPO Front Port 2 to the first (1-4) and third (9-12) fiber receiving areas of MPO Rear Port 2, fibers going from the second (5-8) fiber receiving group of MPO Front Port 3 to the second (5-8) fiber receiving area of MPO Rear Port 2, and fibers going from the first (1-4), third (9-12), and fourth (12-16) fiber receiving area of MPO Front Port 3 to the first (1-4), second (5-8), and third (9-12) fiber receiving areas of MPO Rear Port 1.

Figure 5:
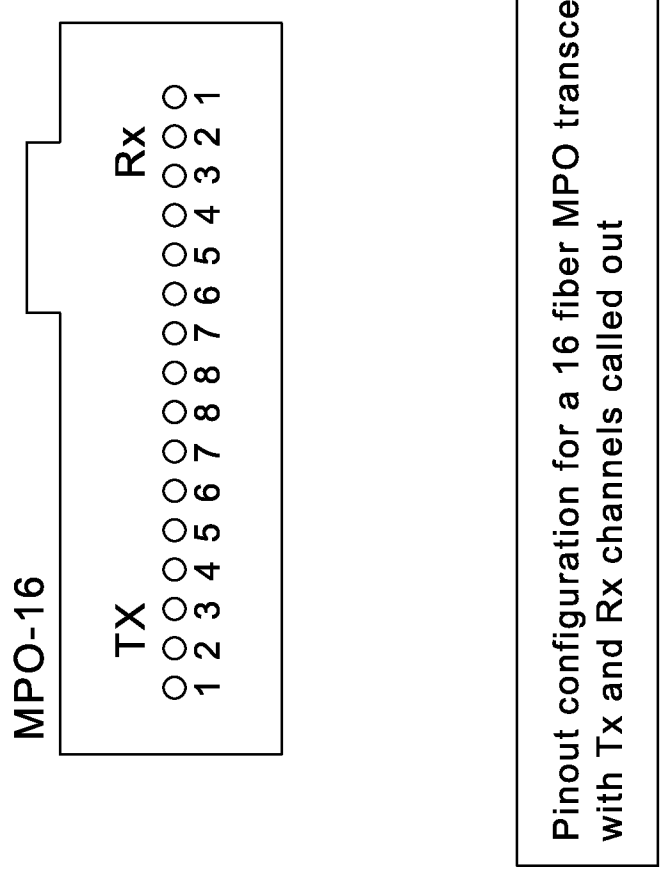
FIG. 5 shows the pinout configuration for a 16 MPO transceiver.

The transceiver which will primarily be used in the link and accepts the 16 fiber MPO with these conversion cassettes has a Transceive (Tx) and Receive (Rx) pinout as shown in FIG. 5. Due to the makeup of the transceiver, an angled polish on the endface of the 16 fiber MPO may be needed. Angled polished connectors (APC) have been used extensively in the past for singlemode applications to create better contact between the fibers when mated in an adapter. With APC connectors, Type A "Key-Up to Key-Down" adapters will need to be used. If Type B "Key-Up to Key-Up" adapters are used, the angled end faces of the APC connectors will interfere and prohibit the connectors from properly mating. In FIG. 4, the conversion cassette is designed to only use Key-Up to Key-Down adapters, so APC connectors can be used if needed.

Figure 6A:
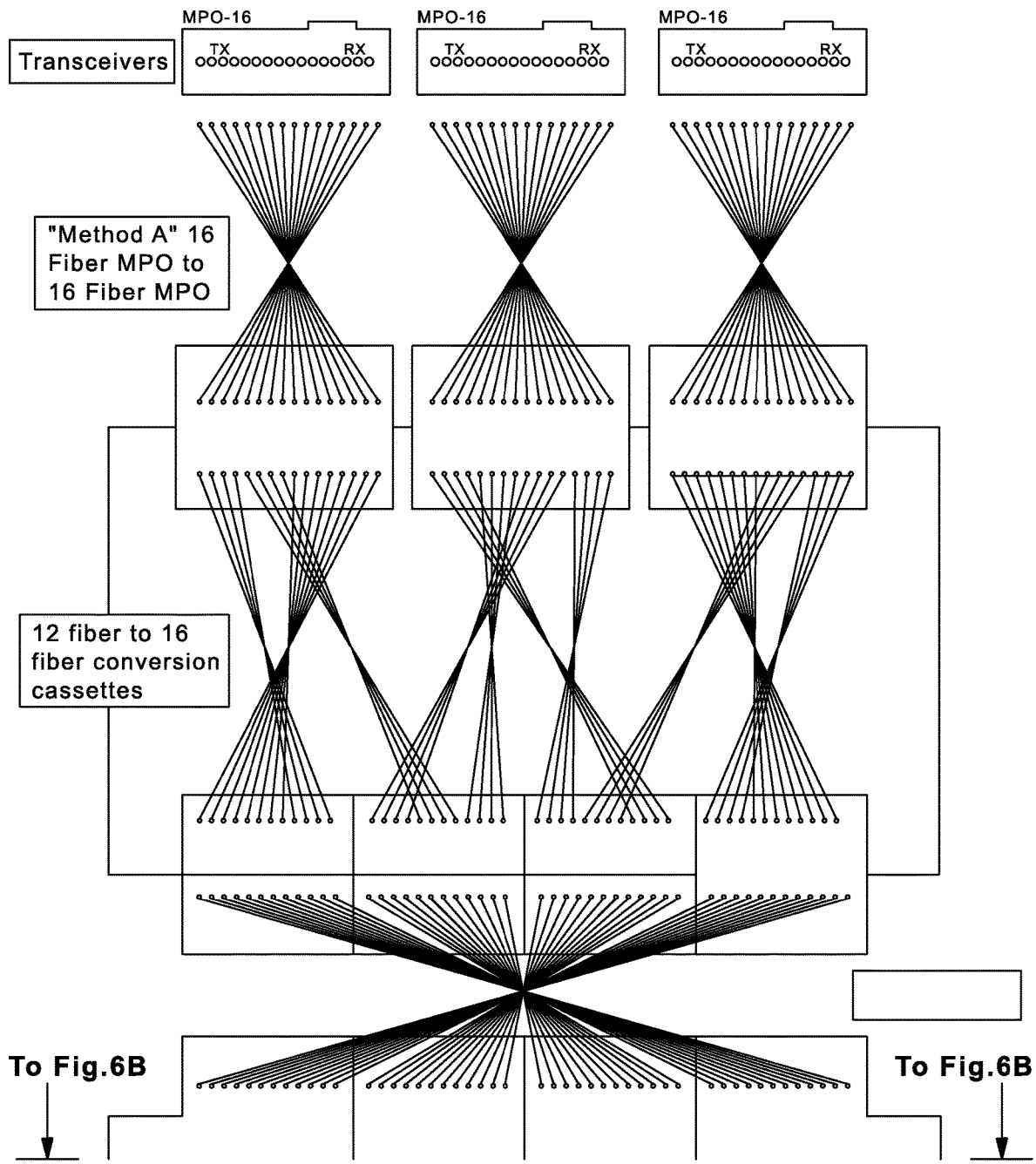
FIG. 6a shows the first part of a detailed wiring diagram for the datacenter layout shown in FIG. 3.
Figure 6B:
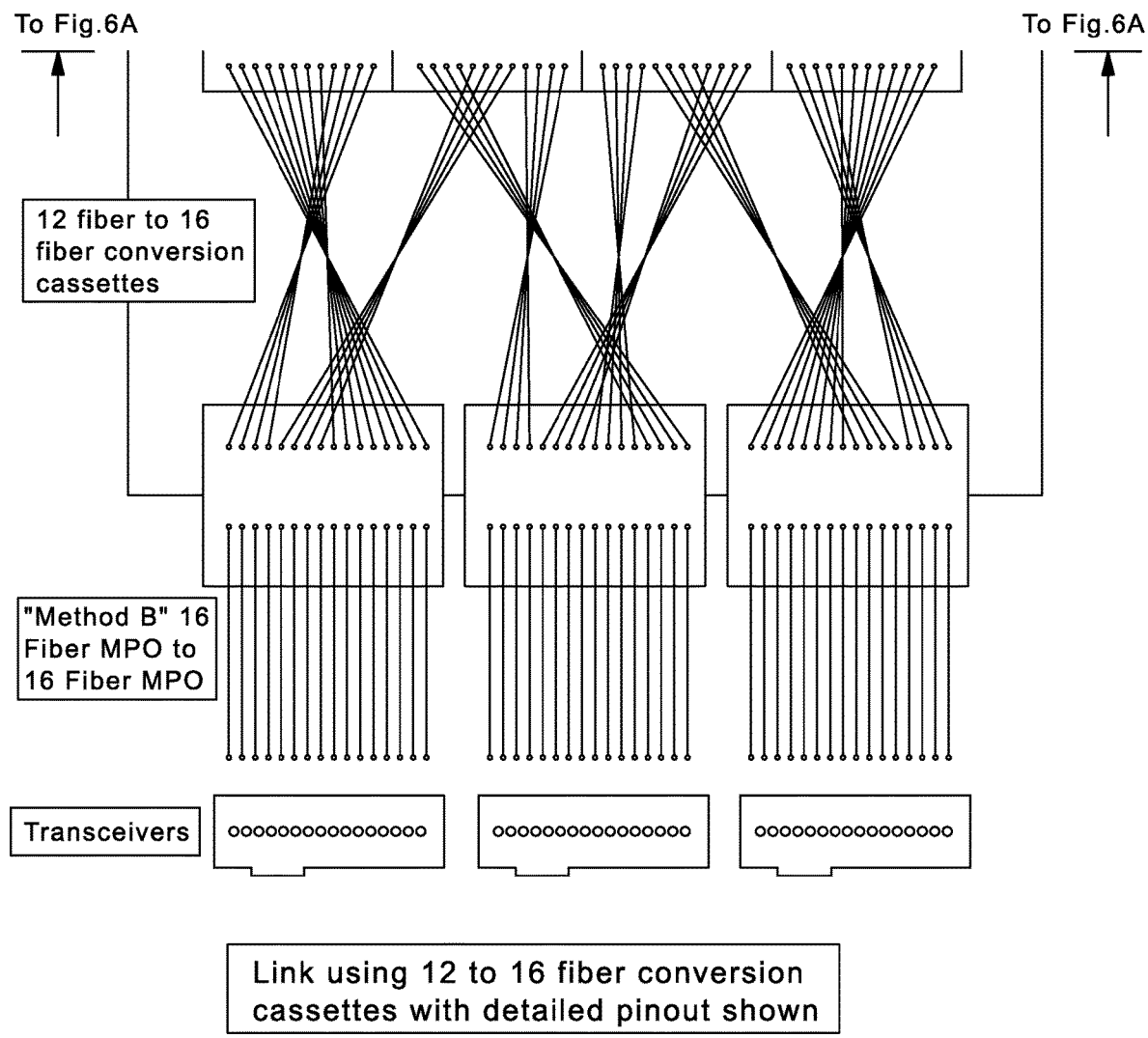
FIG. 6b shows the second part of a detailed wiring diagram for the datacenter layout shown in FIG. 3.

FIG. 3 shows a high level view of the link within which this conversion cassette will be used. FIGS. 6a and 6b are a detailed view with the pinouts of all the parts in the link, to better understand how the link in total will work.

Figure 7:
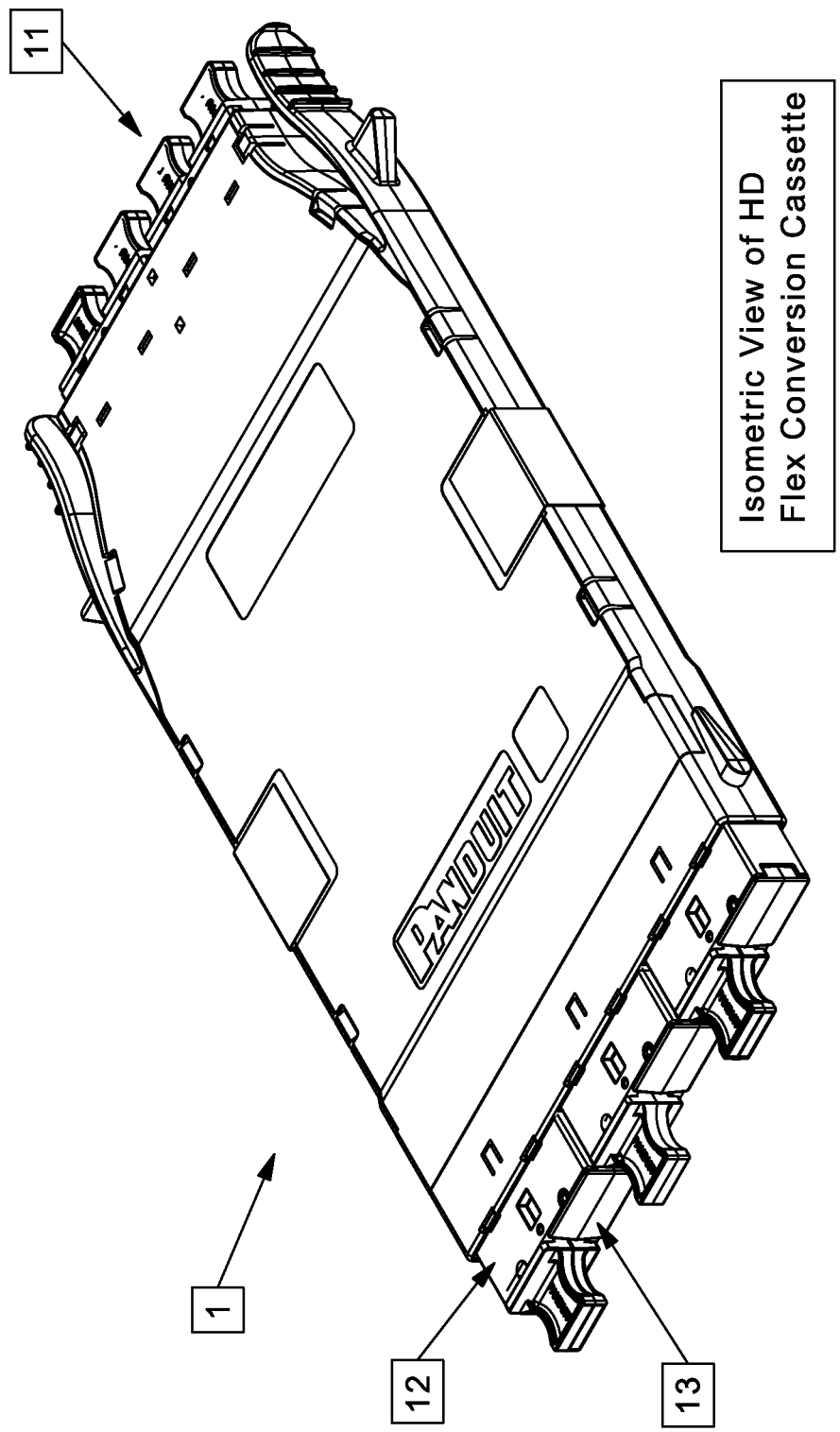
FIG. 7 shows an isometric view of a first form factor cassette that may be used with the present invention.
Figure 8:
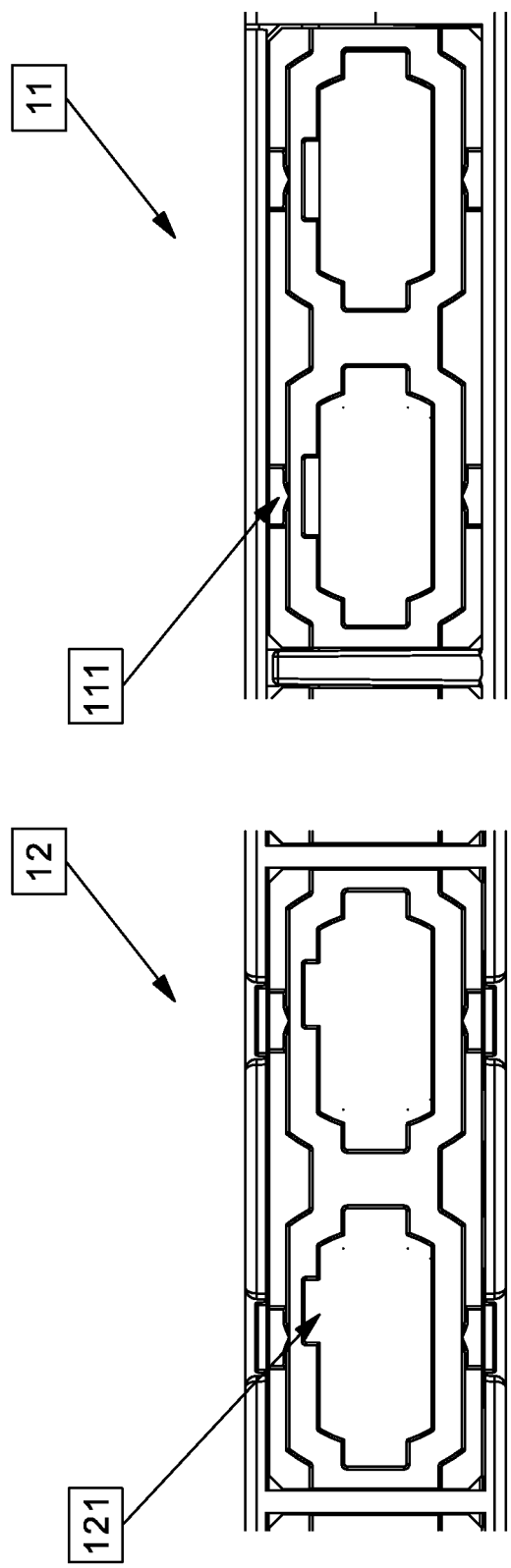
FIG. 8 shows detailed views of the 12 and 16 fiber MPO adapters used in the cassettes of FIG. 7.

Various cassette form factors can be used as carriers for the fanout described above. Smaller profile cassettes (1) as shown in FIG. 7 can be used with MPO adapters on the front and back of the cassette. Four 12 fiber MPO adapters (11) will be located on the back of the cassette (1). Keying feature (111) will be centered on the 12 fiber MPO adapters (11). The centering of this feature is compatible with 12 fiber MPO connectors. Six 16 fiber MPO adapters (12) will be located on the front of the cassette (1). Keying feature (121) will be offset on the 16 fiber MPO adapters (12). The offset of this feature enables compatibility with 16 fiber MPO connectors. MPO blanks (13) will be used on three of the six MPO adapters, as only three adapters will be used in this application.

Figure 9:
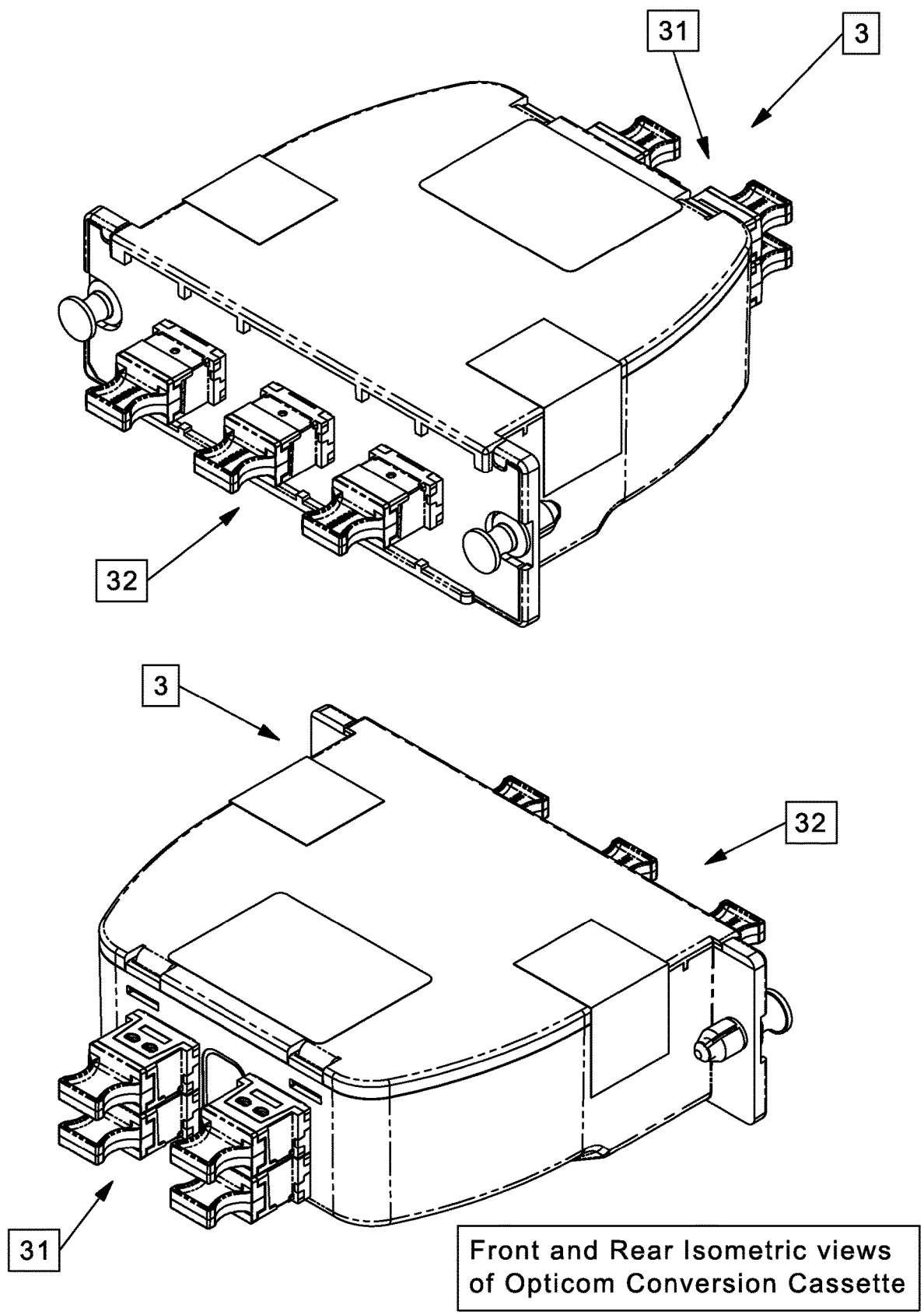
FIG. 9 shows first isometric views of a second form factor cassette that may be used in the present invention.

In a similar fashion, the cassette (3) of FIG. 9, a larger profile as compared to FIG. 7, will allow connection to four 12 fiber MPO connectors in the rear of the cassette, and three 16 fiber MPO connectors in the front of the cassette. Four 12 fiber MPO adapters (31) will be located on the back of the cassette, and three 16 fiber MPO adapters (32) will be located on the front of the cassette. No MPO blanks will be needed for this form factor of conversion cassette.

An alternate embodiment to having the conversion module would be to instead have cable assembly (harness) which have three 16 fiber MPO connectors on one end of the assembly, and four 12 fiber MPO connectors on the other end of the assembly. This assembly could be attached to the existing cabling infrastructure by way of MPO coupler panels. The pinout depicted in above would be identical to the pinout and polarity seen in this cable harness assembly.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

The invention claimed is:

1. A module for connecting 16 fiber MPOs to 12 fiber MPOs comprising:
   a first, second, and third 16 fiber MPO, each MPO having 4 fiber receiving areas, each fiber receiving area has four fibers entering the fiber receiving area;
   a first, second, third, and fourth 12 fiber MPO, each 12 fiber MPO having 3 fiber receiving areas, each fiber reception area has four fibers entering the fiber receiving area;
   fibers connecting the first, second, and fourth fiber receiving areas of the first 16 fiber MPO to the first, second, and third fiber receiving areas of the fourth 12 fiber MPO; and
   fibers connecting the third fiber receiving area of the first 16 fiber MPO to the second fiber receiving area of the third 12 fiber MPO.

2. The module of claim 1 further comprising fibers connecting the first and fourth fiber receiving area of the second 16 fiber MPO to the first and third fiber receiving areas of the third 12 fiber MPO and fibers connecting the second and third fiber receiving areas of the second 16 fiber MPO to the first and third fiber receiving areas of the second 12 fiber MPO.

3. The module of claim 2 further comprising fibers connecting the first, third, and fourth fiber receiving areas of the third 16 fiber MPO to the first, second, and third fiber receiving areas of the first 12 fiber MPO and fibers connecting the second fiber receiving area of the third 16 fiber MPO to the second fiber receiving are of the second 12 fiber MPO.

4. The module of claim 3 further comprising key-up to key-down MPO adapters engaged to each 12 and 16 fiber MPO.

* * * * *